Patented Apr. 24, 1928.

1,667,214

UNITED STATES PATENT OFFICE.

RICHARD MICHEL, OF UERDINGEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

CONDENSATION PRODUCT FROM OLEFINES AND HYDROCARBONS OF THE NAPHTHALENE SERIES AND PROCESS OF MAKING THE SAME.

No Drawing. Application filed June 21, 1927, Serial No. 200,500, and in Germany February 4, 1926.

The present invention relates to the preparation of condensation products from hydrocarbons of the naphthalene series and olefines.

I have found that olefines generally will react with hydrocarbons of the naphthalene series, such as, for example, naphthalene or a hydrogenated naphthalene compound or other derivative thereof, at elevated temperatures, such as, for example, temperatures between about 50° C. and about 200° C. and under superatmospheric pressure, in the presence of catalytically acting substances, whereby there are obtained homologs, or condensation products, of naphthalene. I have found, further, that, for effecting the aforesaid reaction, it is not necessary to use the olefines in a very concentrated state; the reaction may be effected by operating with gaseous mixtures containing olefines such as, for example, the gaseous mixtures resulting from oil cracking operations, oil gas, and the like. Indeed, it appears that generally my new process is particularly effective when working with gaseous mixtures containing both ethylene and the higher homologs of ethylene. While for the reaction between ethylene alone and a hydrocarbon of the naphthalene series it may be necessary to raise the temperature as high as about 200° C., I have found that in using gaseous mixtures containing ethylene with higher homologs thereof the reaction can readily be carried out under more moderate temperature conditions, such as, for example, between about 50° C. and about 100° C.

Among the catalytically acting substances which have been found to be effective in promoting the aforesaid reaction are metallic chlorides, particularly aluminum chloride and iron chloride. With either of these reaction promoters there may be combined also other substances capable of promoting the reaction, such as, for example, benzene hydrocarbons and halogen acids.

The reaction products obtained by the action of the olefines upon naphthalene are found to consist mainly of mono-, or polyalkylated naphthalenes or higher condensation products thereof, depending largely upon the operating conditions.

Although, according to the literature, only mono-alkyl-naphthalene is known, by the application of my process there are obtained, besides mono-alkyl-naphthalene, substances of a higher boiling point which apparently are poly-alkyl-naphthalenes. Finally, by more intensified action, condensation products are obtained in the form of highly viscous, strongly fluorescent oils. The reaction between olefines and hydrogenated, or differently substituted, naphthalenes proceeds in an analogous manner.

The process may be illustrated by the following examples:

Example 1.

In an autoclave of 300 liters capacity 128 kg. of naphthalene and 4 kg. of aluminum chloride are stirred for some 4 hours with ethylene under a pressure of 20 atmospheres at from 100 to 200° C. The commencement of the reaction is advantageously promoted by passing in a little hydrogen chloride gas. The consumed ethylene is constantly replenished from a container under pressure until a total of 38 kg. has been absorbed. After cooling the contents of the autoclave and removing the aluminum chloride, distillation is effected. The first runnings contain benzene, then 25 kg. of unchanged naphthalene distill over and then 110 kg. of oily product, while 25 kg. of an undistillable residue are left behind. The oily portion boils under ordinary pressure between 250 and 400° C. consisting of a mixture of β mono-ethylnaphthalene, di- and poly-ethylnaphthalenes and binaphthyl derivatives. The quantities of these products are influenced by different variations of the above-mentioned conditions.

Example 2.

132 kg. of tetrahydronaphthalene are treated with ethylene in a similar manner in the presence of 2 kg. of aluminum chloride at 100° C. under superatmospheric pressure. An oil is thus obtained boiling between 240° C. and 340° C. and only quite small quantities of a non-volatile residue remain. Instead of aluminum chloride, iron chloride and other metal chlorides of that kind can be used with similar effect.

If instead of tetrahydronaphthalene, dekahydronaphthalene is employed, an oily reaction product results which boils between 200 and 290° C. and likewise leaves practically no residue.

When mixtures of ethylene and the higher homologs thereof such as, for example, propylene, butylene, hexylene, and the like, are substituted for the ethylene in the reactions as illustrated above, it has been observed that the higher homologs of ethylene react with the naphthalene compound more readily than does ethylene alone. A further observation is that the higher homologs of ethylene exert a carrier effect in the reaction between ethylene itself and the naphthalene compound whereby, in their presence, ethylene reacts more readily and under more moderate temperature conditions.

The reaction between hydrocarbons of the naphthalene series and gaseous mixtures containing both ethylene and higher homologs of ethylene may be illustrated by the following example.

*Example 3.*

As the mixed olefine-containing gas there is used a gas of about 30% olefine content, of which from about 20 to about 25% is ethylene and the remaining part consists of higher homologs of ethylene. The gas mixture preferably should be free from hydrogen sulfide and from water vapor; it may, however, contain sulfur compounds other than hydrogen sulfide without particular detriment.

The gas is caused to react upon about 128 parts by weight of molten naphthalene contained in a pressure tight reaction vessel in the presence of about 3.5 to 4 parts by weight of aluminum chloride, at a temperature of about 80° C. and under a pressure of from 20 to 30 atmospheres in such manner that the gas is continuously forced into the pressure tight reaction vessel while the residual gas,—free from, or poor in, olefines,—continuously is allowed to escape. After continuing this operation for a short time the reaction mixture is found to consist of about 150 parts by weight of a mixture of oils free from unchanged naphthalene and about 28 parts by weight of recoverable unchanged naphthalene. The mixture of oils consists almost exclusively of the homologs of naphthalene; the individual components of the oily mixture are practically all stable and boil without decomposition. They possess great value as starting materials for the preparation of various intermediate products, and as well are found to be motor spirits having desirable properties.

The process can also be carried out in such a manner that several pressure vessels charged with the napthalene compound and catalyst are successively traversed by the crude gas containing olefines. In this manner, the process can be carried out continuously and the olefines contained in the crude gas can thus be completely consumed. There is yet another method of working according to which the olefines from the gases resulting from cracking processes are absorbed by the naphthalene in successive stages, whereby different products can be obtained, since the homologs of ethylene react considerably more easily than ethylene itself.

I claim:

1. Process which comprises reacting with olefines upon hydrocarbons of the naphthalene series, in the presence of a catalytically active metallic halide, under conditions of elevated temperature over 50° C. and super-atmospheric pressure.

2. Process which comprises reacting with olefines upon hydrocarbons of the naphthalene series, in the presence of catalytically active metallic chlorides, under super-atmospheric pressure and at temperatures from about 50° C. to about 200° C.

3. Process which comprises reacting with an olefinic gas containing a higher homolog of ethylene upon a hydrocarbon of the naphthalene series, in the presence of a catalytically acting metallic chloride, under superatmospheric pressure and at a temperature of at least about 50° C.

4. Process which comprises reacting with an olefinic gas containing ethylene and a higher homolog of ethylene, upon a hydrocarbon of the naphthalene series, in the presence of a catalytically acting metallic chloride, under superatmospheric pressure and at a temperature of at least about 50° C.

5. Process which comprises reacting upon naphthalene with a gas having an olefine content of about 30% of which from about 20 to about 25% is ethylene and the remaining part consists of higher homologs of ethylene, in the presence of a catalytically acting metallic chloride, under a pressure of from 20 to 30 atmospheres and at a temperature of about 80° C.

6. As new products condensation products from olefines and hydrocarbons of the naphthalene series comprising poly-alkylated hydrocarbons of the naphthalene series wherein some of the alkyl groups of said hydrocarbons contain more than two carbon atoms.

7. As new products, the condensation products obtainable by reacting with an olefinic gas containing a higher homolog of ethylene upon a hydrocarbon of the naphthalene series, in the presence of a catalytically acting metallic chloride, under superatmospheric pressure and at a temperature of at least about 50° C.

In testimony whereof, I affix my signature.

RICHARD MICHEL.